United States Patent
Yan et al.

(10) Patent No.: US 10,794,280 B2
(45) Date of Patent: Oct. 6, 2020

(54) AIR INTAKE FOR GAS TURBINE ENGINE

(71) Applicant: PRATT & WHITNEY CANADA CORP., Longueuil (CA)

(72) Inventors: Guo Rong Yan, Montreal (CA); Mark Huzzard Cunningham, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 332 days.

(21) Appl. No.: 15/974,298

(22) Filed: May 8, 2018

(65) Prior Publication Data

US 2018/0328283 A1    Nov. 15, 2018

Related U.S. Application Data

(60) Provisional application No. 62/506,192, filed on May 15, 2017.

(51) Int. Cl.
    *F02C 7/04*    (2006.01)
    *B64D 33/02*   (2006.01)
    (Continued)

(52) U.S. Cl.
    CPC ............ *F02C 7/04* (2013.01); *B64D 27/10* (2013.01); *B64D 33/02* (2013.01); *F02C 7/052* (2013.01);
    (Continued)

(58) Field of Classification Search
    CPC .. F02C 7/04; F02C 7/042; F02C 7/045; F02C 7/047; F02C 7/05; F02C 7/052;
    (Continued)

(56) References Cited

U.S. PATENT DOCUMENTS

| | | | | |
|---|---|---|---|---|
| 3,119,581 A | * | 1/1964 | Trevaskis | F02C 7/042 |
| | | | | 244/53 B |
| 3,583,661 A | * | 6/1971 | Stake | F02C 7/04 |
| | | | | 244/53 B |

(Continued)

FOREIGN PATENT DOCUMENTS

| | | | | |
|---|---|---|---|---|
| DE | 102007014226 A1 | * | 9/2008 | F15D 1/06 |
| GB | 468064 A | * | 6/1937 | B64D 33/02 |

OTHER PUBLICATIONS

Stalewski, Wienczystaw, The Preliminary Design of the Air-Intake System and the Nacelle in the Small Aircraft-Engine Integration Process, Apr. 2014, Aircraft Engineering and Aerospace Technology: An International Journal, vol. 86, No. 3, 2014, pp. 250-258(9). (Year: 2014).*

*Primary Examiner* — Gerald L Sung
*Assistant Examiner* — Marc J Amar
(74) *Attorney, Agent, or Firm* — Norton Rose Fulbright Canada LLP

(57) ABSTRACT

An aircraft intake duct for channeling a flow of ambient air toward an annular engine compressor inlet of a gas turbine engine having a compressor reference axis and a reference plane that extends from such compressor reference axis. The aircraft intake duct includes an oblong air intake inlet for receiving the flow of ambient air, the air intake inlet being offset radially outwardly relative to the compressor reference axis and located on a first side of the reference plane. Two distal intake channels fluidly link distal extremities of the oblong air intake inlet to a segment of the annular engine compressor inlet located on a second side of the reference plane. A central channel fluidly links a central section of the oblong air intake inlet to a segment of the annular engine compressor inlet located on a first side of the reference (Continued)

plane. The distal channels are blended together by the central channel so that a single intake duct is formed.

60 Claims, 14 Drawing Sheets

(51) Int. Cl.
*B64D 27/10* (2006.01)
*F02C 7/052* (2006.01)

(52) U.S. Cl.
CPC ........... *B64D 2033/0293* (2013.01); *F05D 2220/323* (2013.01); *F05D 2220/324* (2013.01); *F05D 2250/51* (2013.01)

(58) Field of Classification Search
CPC . F02C 7/055; B64D 33/02; B64D 2033/0226; B64D 2033/0253; B64D 2033/0266; B64D 2033/0273; B64D 2033/0286; B64D 2033/0293
See application file for complete search history.

(56) References Cited

U.S. PATENT DOCUMENTS

| | | | |
|---|---|---|---|
| 4,456,458 A * | 6/1984 | Gilbertson | B01D 45/04 244/53 B |
| 5,058,379 A * | 10/1991 | Lardellier | F02K 3/065 60/226.1 |
| 6,990,798 B2 | 1/2006 | Bouchard et al. | |
| 9,057,329 B2 | 6/2015 | Weir et al. | |
| 9,091,207 B2 * | 7/2015 | Chanez | F02C 7/05 |
| 10,167,740 B2 * | 1/2019 | Beutin | F02K 7/16 60/225 |
| 2003/0024233 A1 * | 2/2003 | Snyder | F01D 25/162 60/39.092 |
| 2006/0107648 A1 * | 5/2006 | Bulman | F02K 7/16 60/225 |
| 2007/0095033 A1 * | 5/2007 | Snyder | B01D 45/08 55/440 |
| 2007/0186534 A1 * | 8/2007 | Snyder | F02C 7/052 60/39.092 |
| 2013/0216371 A1 * | 8/2013 | Weir | F02C 6/206 415/207 |
| 2013/0313371 A1 * | 11/2013 | Lamb, Jr. | B64D 33/02 244/53 B |
| 2014/0083518 A1 * | 3/2014 | Whitmore | B64D 33/02 137/15.1 |
| 2014/0241342 A1 | 8/2014 | Constantinof | |
| 2016/0160757 A1 * | 6/2016 | Todorovic | F02C 7/04 415/115 |
| 2016/0177872 A1 | 6/2016 | Akcayoz et al. | |
| 2016/0245152 A1 * | 8/2016 | Thomassin | F02C 7/04 415/115 |
| 2016/0245161 A1 * | 8/2016 | Thomassin | F02C 7/04 |
| 2016/0245166 A1 * | 8/2016 | Thomassin | F02C 7/04 |
| 2016/0265435 A1 * | 9/2016 | Snyder | B64D 35/06 |
| 2017/0184020 A1 * | 6/2017 | Miller | B64D 33/08 |
| 2017/0241341 A1 * | 8/2017 | Gekht | F02C 7/04 |
| 2018/0128183 A1 * | 5/2018 | Escure | B64D 35/06 |
| 2018/0141670 A1 * | 5/2018 | Keller | B64D 33/08 |
| 2020/0088097 A1 * | 3/2020 | Bouldin | B64D 29/00 |

* cited by examiner

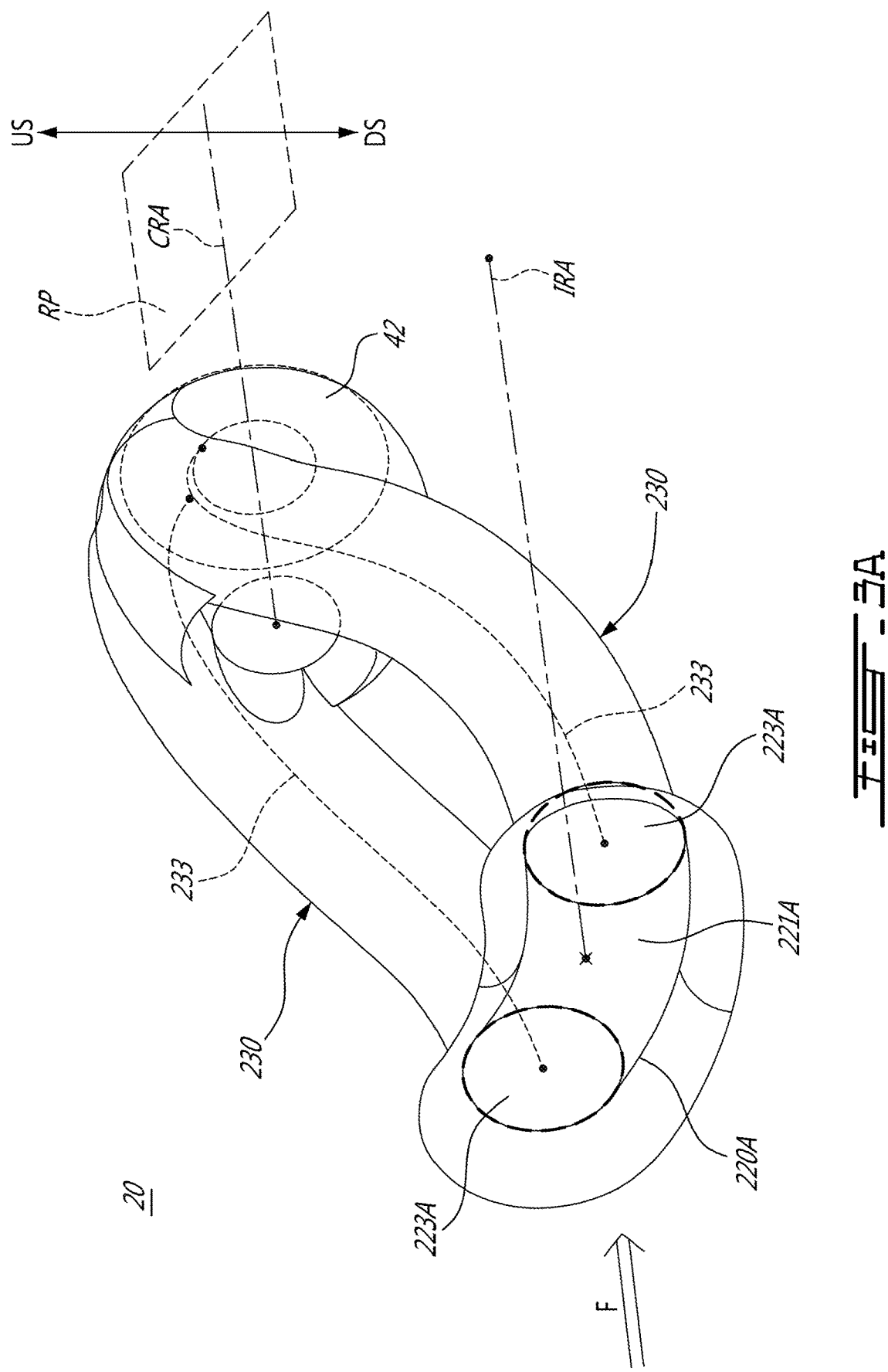

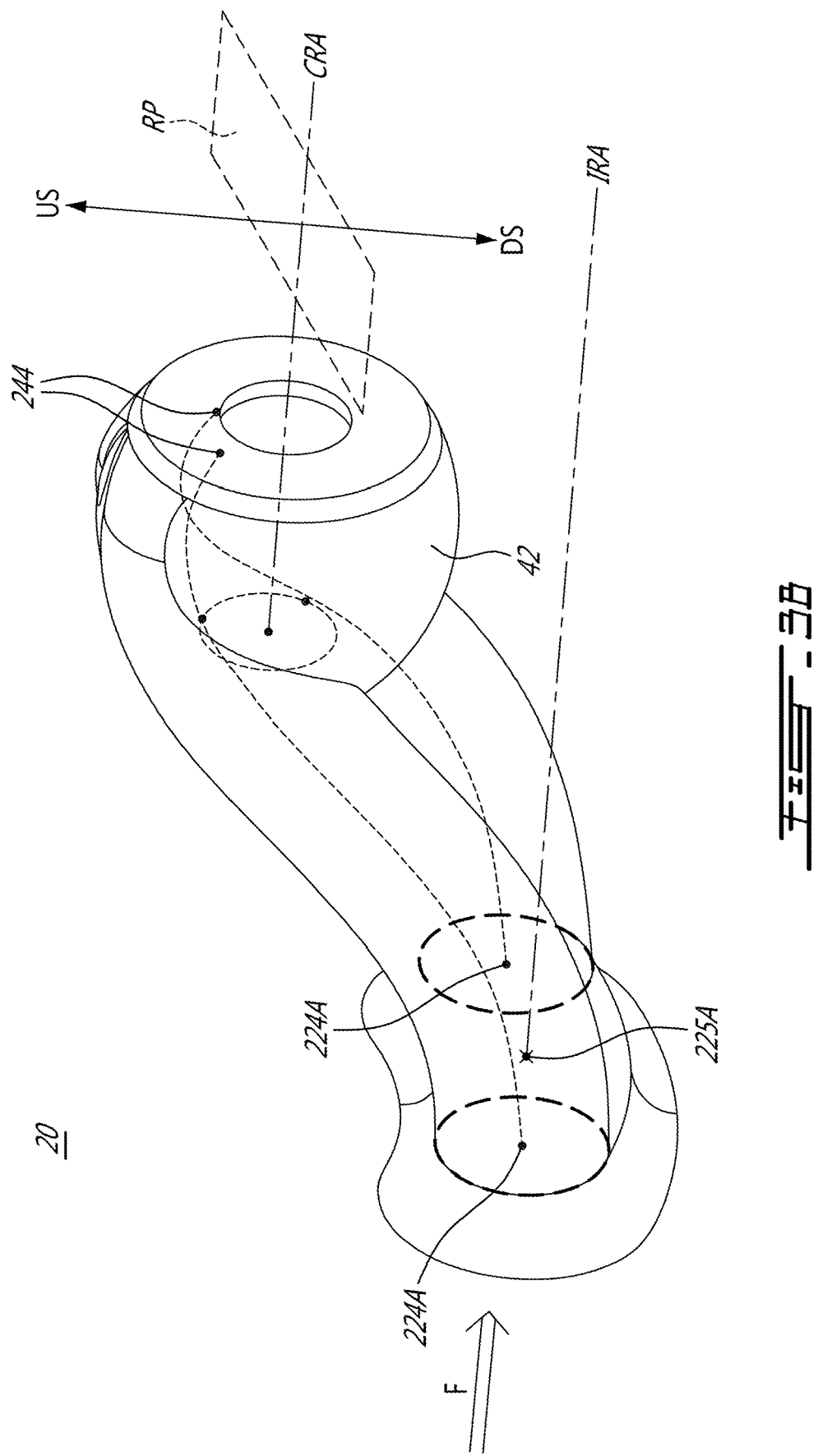

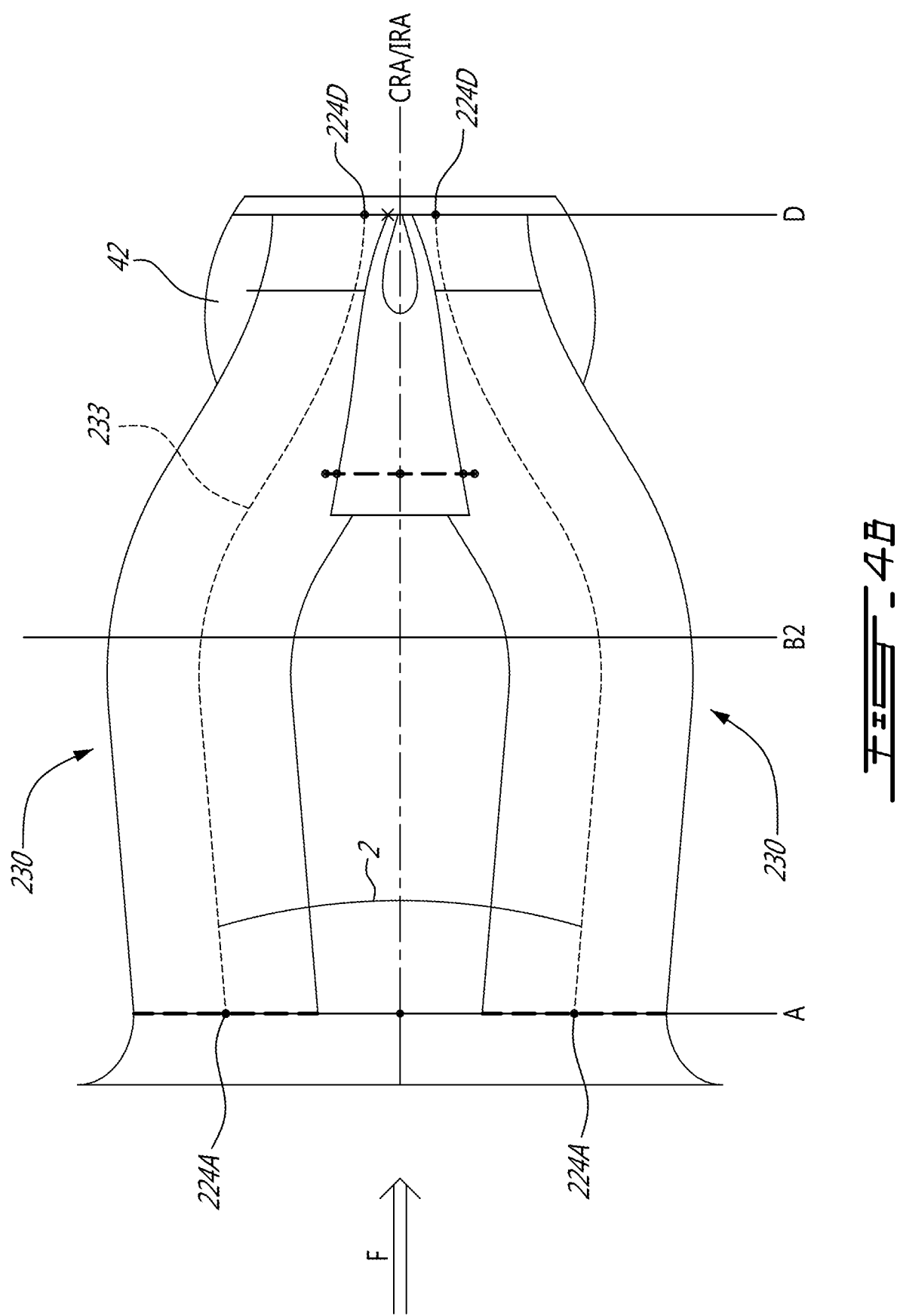

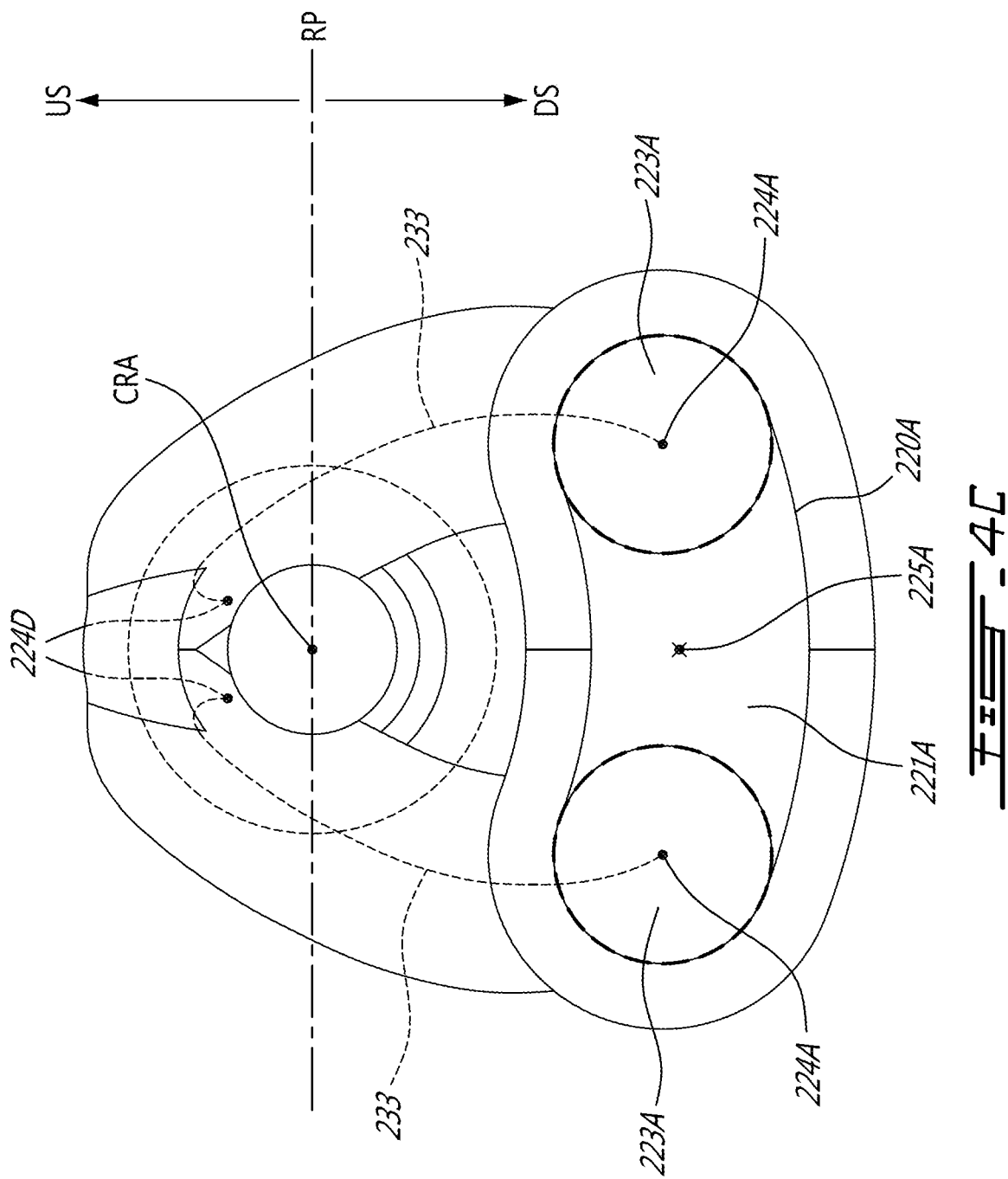

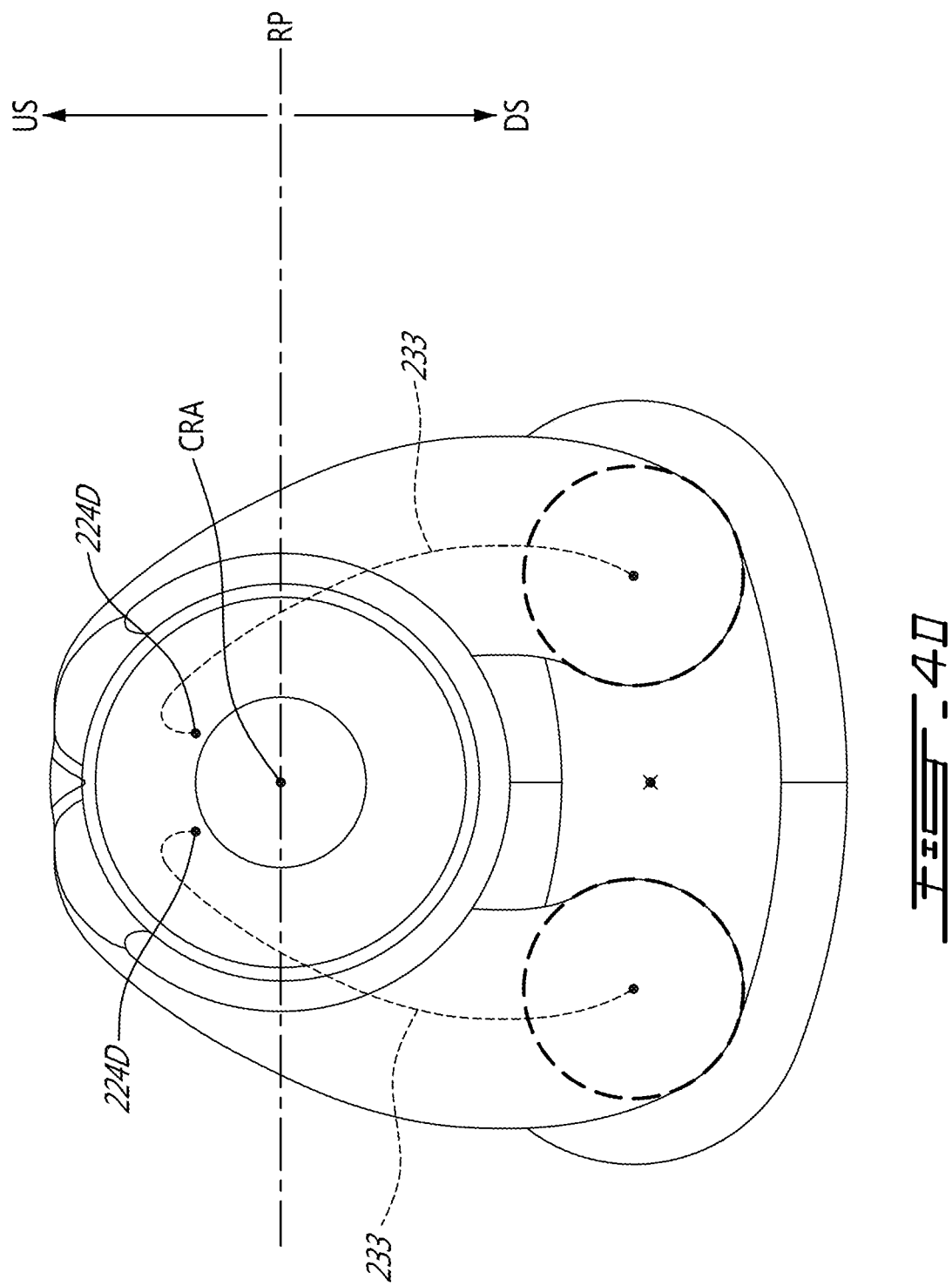

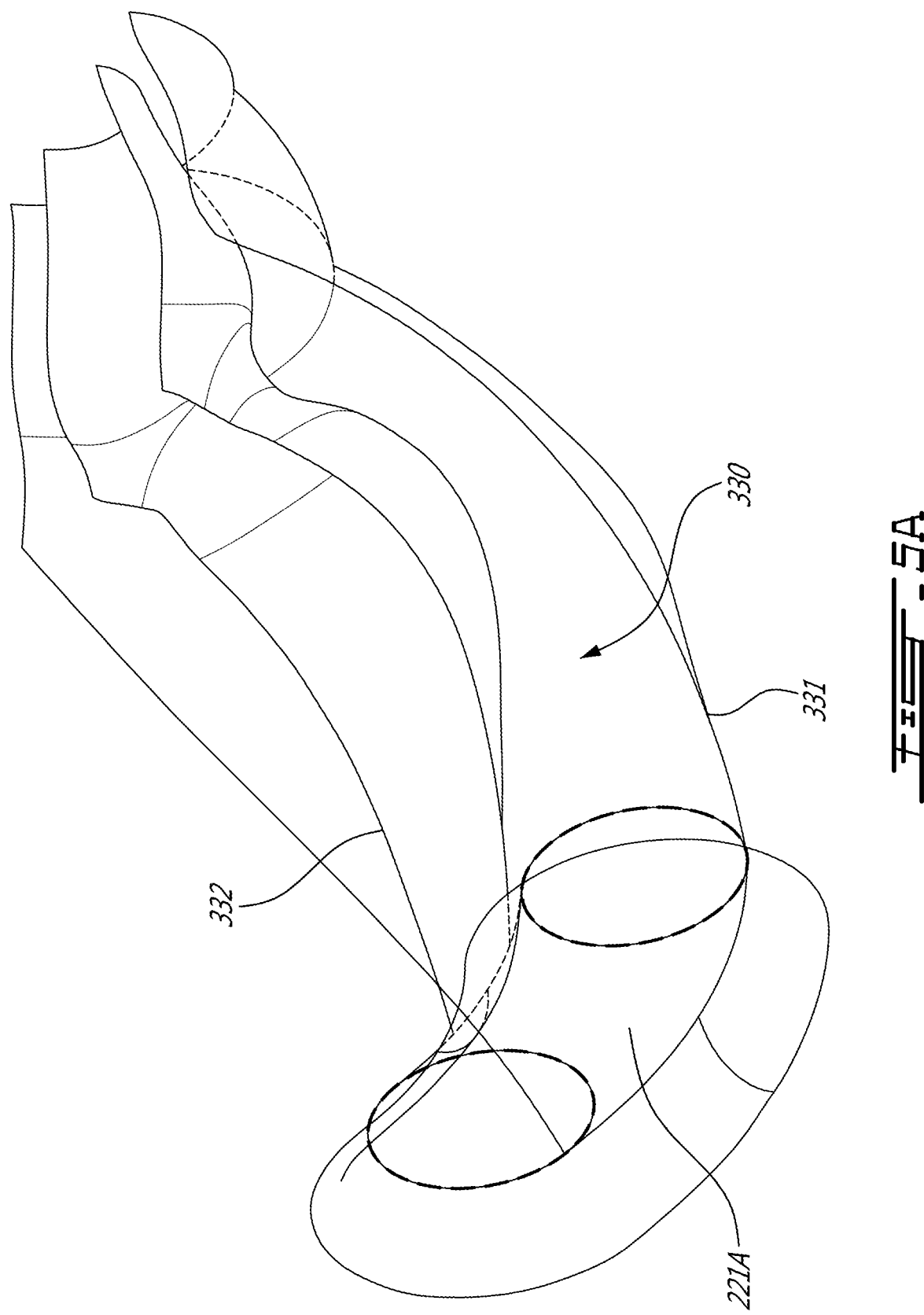

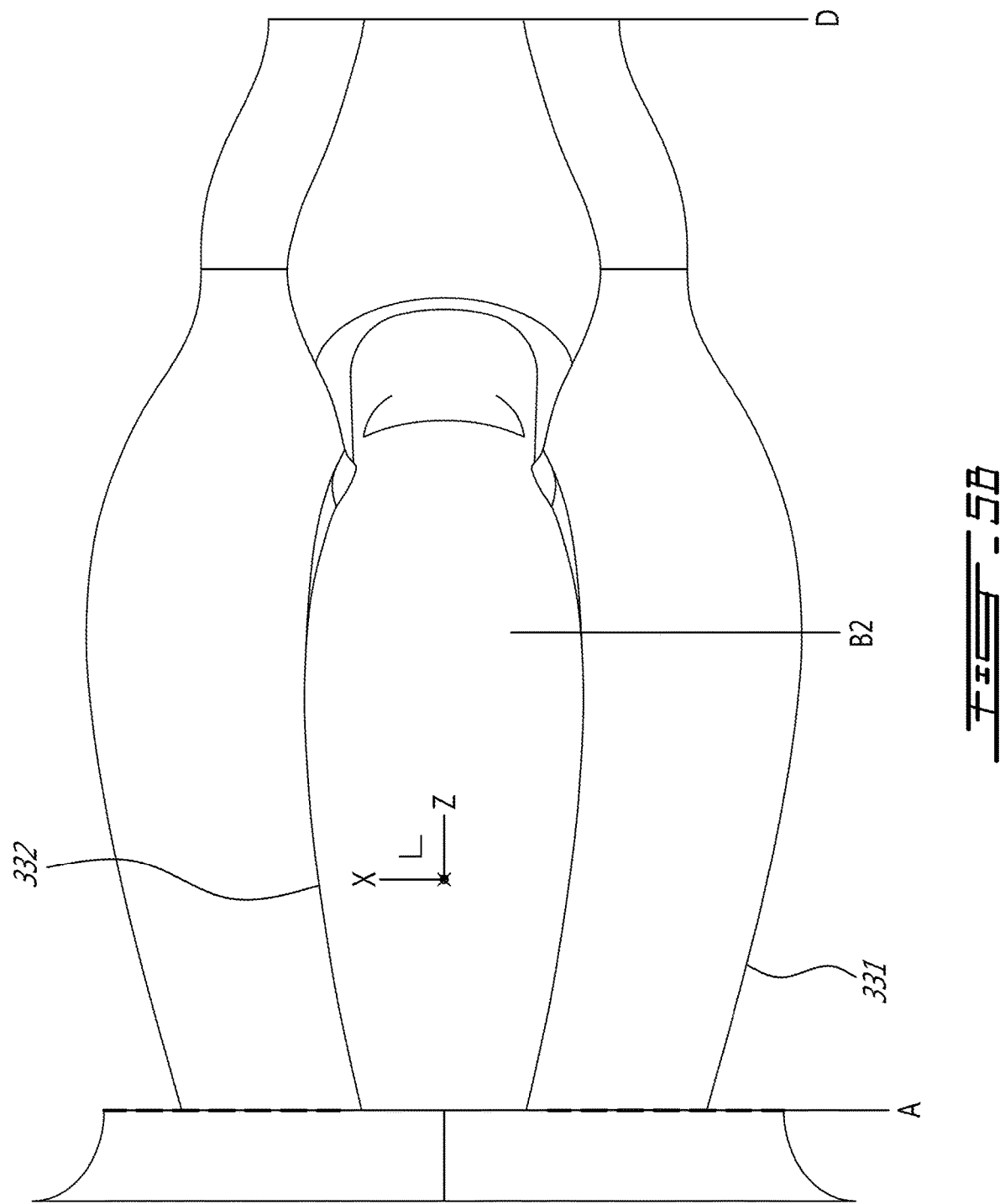

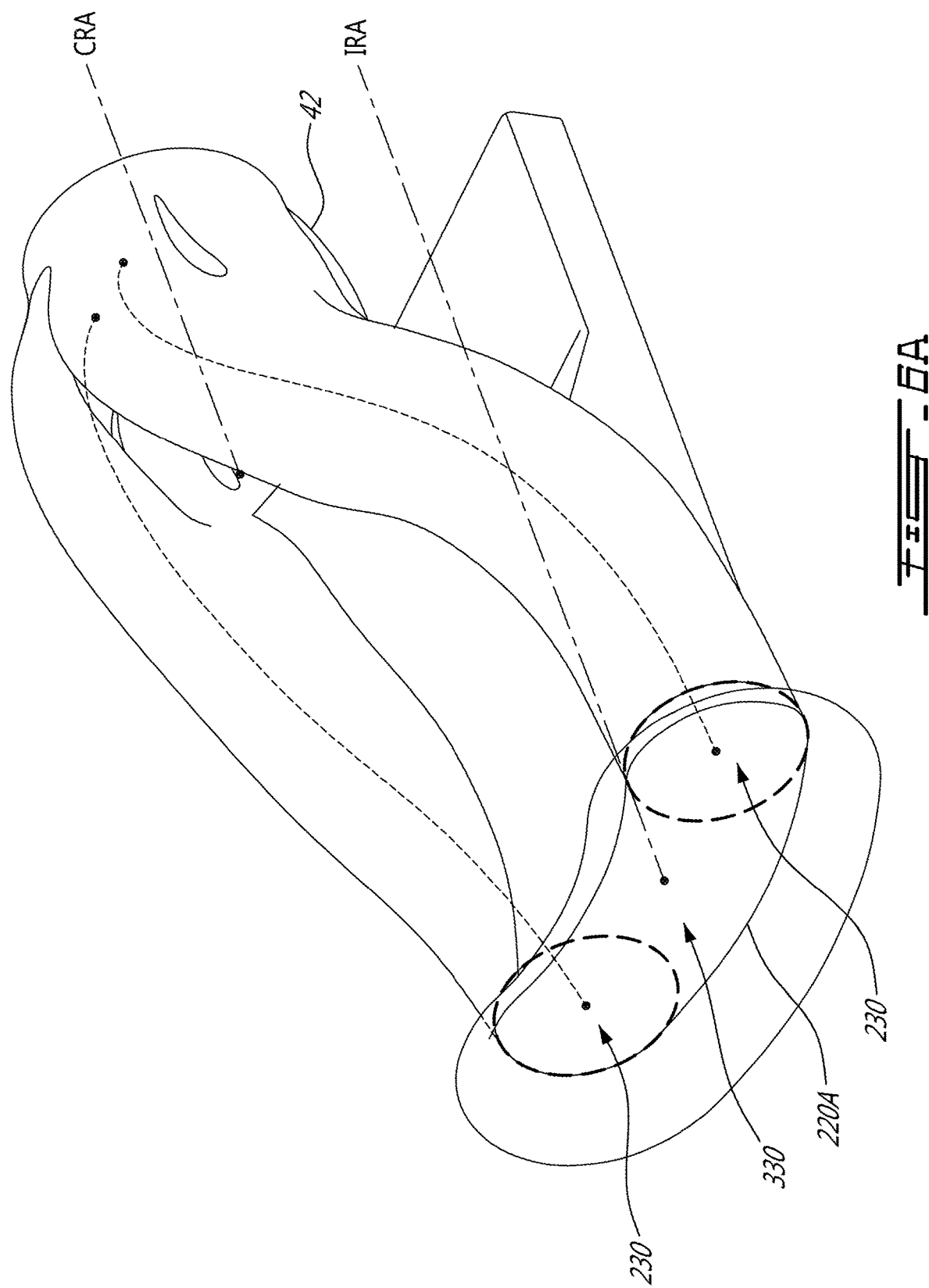

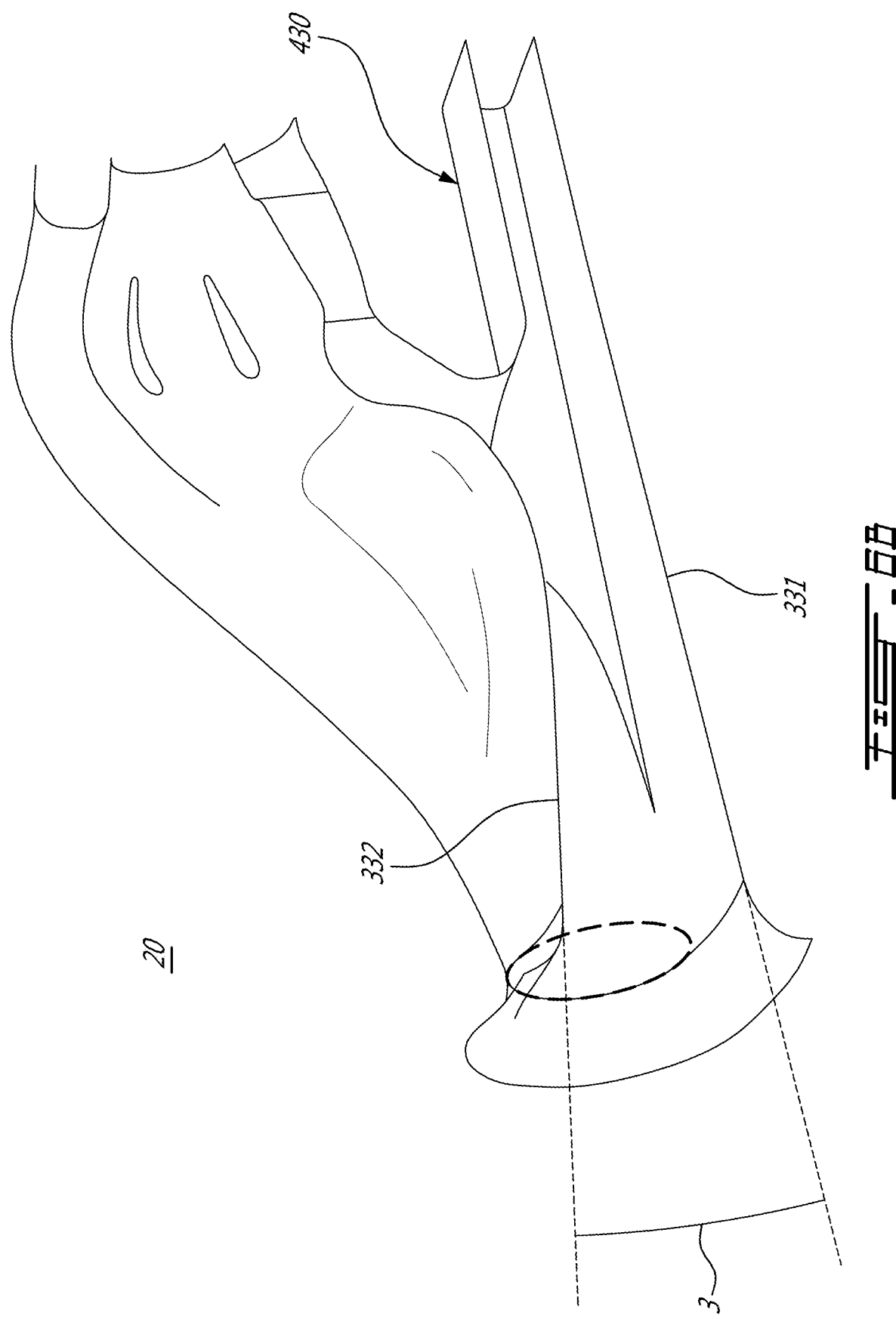

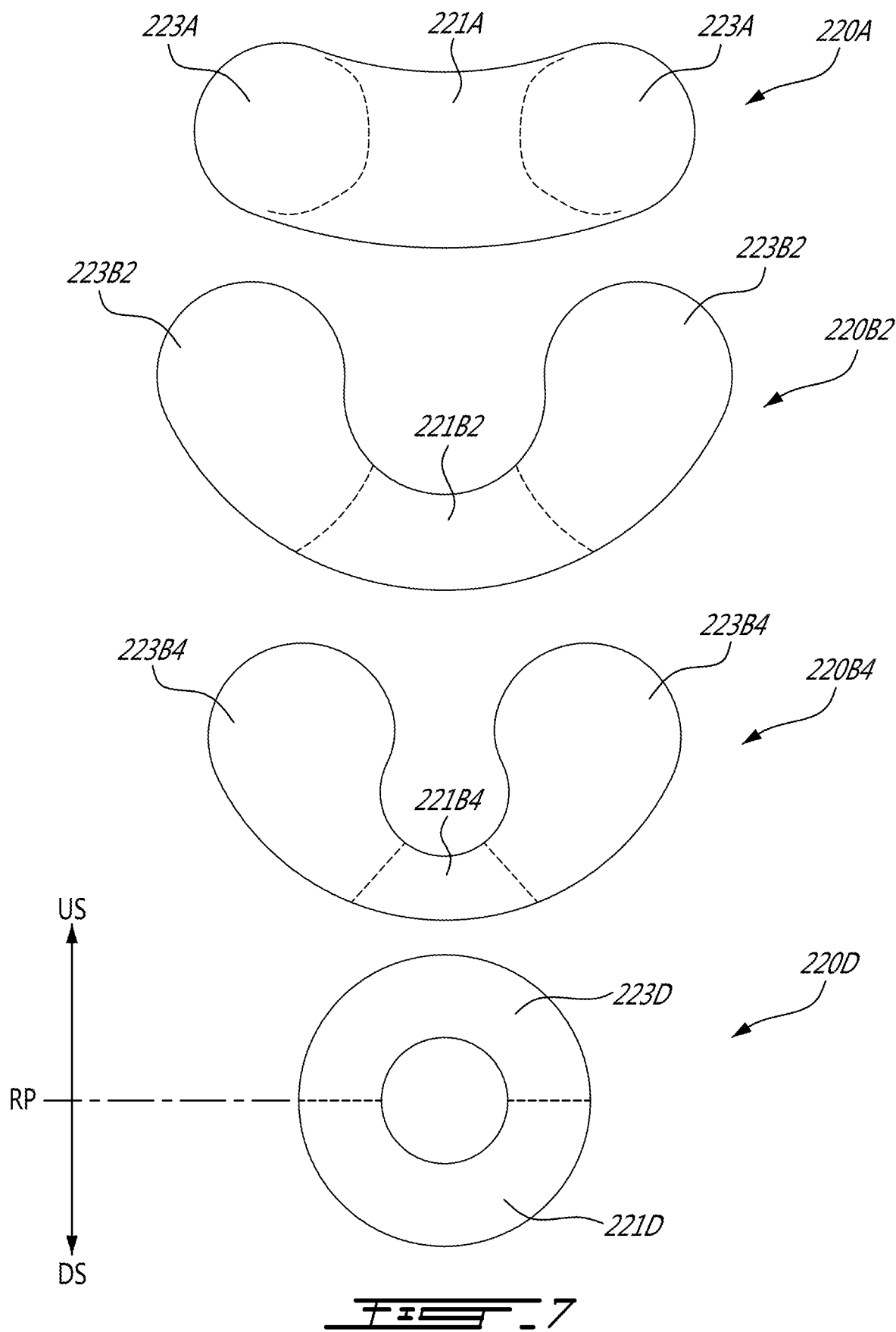

AIR INTAKE FOR GAS TURBINE ENGINE

CROSS-REFERENCE TO RELATED APPLICATIONS

The present application claims priority on U.S. Patent Application No. 62/506,192 filed May 15, 2017, the entire content of which is incorporated herein by reference.

TECHNICAL FIELD

The disclosure relates generally to aircraft intake systems for aircraft engine like gas turbine engines, and more particularly to aircraft intake systems for turboprop and turboshaft type gas turbine engines.

BACKGROUND

An aircraft intake system of a gas turbine engine delivers ambient air to the compressor of the gas turbine engine. For turboprop engines used in aircraft applications, installation constraints often lead to aircraft intake systems having complex shapes that can cause energy losses and distortion in the air flow, which can adversely affect the operation of the engine, more specifically the operation of the engine compressor.

There is an ongoing need for improved aircraft intake systems on such engines.

SUMMARY

In one aspect, there is provided a gas turbine engine having an aircraft intake duct for an annular engine compressor inlet of the gas turbine engine, the annular engine compressor inlet having a compressor reference axis that is substantially coaxial with a centerline of the engine and a reference plane extending from such compressor reference axis, the reference plane dividing the compressor inlet into a first side and an opposite second side, the aircraft intake duct comprising: an oblong air intake inlet located on the first side of the reference plane; a top wall and a bottom wall extending downstream from such air intake inlet and being slanted towards one another to define a contracting central intake channel of the aircraft intake duct; and two side walls extending downstream from such air intake inlet and being slanted away from one another to define two distal intake channels of the aircraft intake duct, the two distal intake channels being located on each side of the central intake channel.

Each distal intake channel, downstream of the air intake inlet, may turn upwards towards the compressor reference axis and the reference plane.

Each distal intake channel, downstream of the air intake inlet, may first turn away from the compressor reference axis, substantially parallel to the reference plane, then turn towards such compressor reference axis.

The central intake channel may be defined by a top wall and a bottom wall extending from such air intake inlet, both walls being angled towards one another to define a contracting central intake channel.

The central intake channel may fluidly link each distal intake channel to one another.

In accordance with another aspect, there is provided an intake assembly for a gas turbine engine, the intake assembly comprising an inlet duct extending from an intake opening to an outlet opening and defining a channel therebetween, a first reference axis extending through the intake opening, the outlet opening adapted to supply air to a compressor of the gas turbine engine, the compressor rotatable around a second reference axis spaced apart from the first reference axis, the first and second reference axes extending parallel relative to each other and coplanar in a centerline plane, the centerline plane symmetrically dividing the inlet duct along the channel, the inlet duct defining two lateral channel portions which are spaced apart on opposite sides of the centerline plane, each one of the lateral channel portions extending along a path defined by a spline from the intake opening to the outlet opening, a turning angle is defined between a tangent of the spline and the first reference axis when the spline is orthogonally projected onto the centerline plane, the turning angle increasing from the intake opening to a maximum turning angle at a first transition position along the spline and then decreasing until reaching the outlet opening, and when the splines are orthogonally projected onto a transverse plane perpendicular to the centerline plane, the splines diverge from one another between the intake opening and a second transition position along the transverse plane and then converge toward each other until the outlet opening.

In accordance with another aspect, there is also provided a turboprop gas turbine engine comprising: a propeller; a compressor mounted downstream of the propeller relative to a direction of an air flow from the propeller to the compressor; and an intake assembly disposed between the propeller and the compressor, the intake assembly comprising: an inlet duct extending from an intake opening to an outlet opening and defining a channel therebetween, a first reference axis extending through the intake opening, the outlet opening adapted to supply air to a compressor of the gas turbine engine, the compressor rotatable around a second reference axis spaced apart from the first reference axis, the first and second reference axes extending parallel relative to each other and coplanar in a centerline plane, the centerline plane symmetrically dividing the inlet duct along the channel, the inlet duct defining two lateral channel portions which are spaced apart on opposite sides of the centerline plane, each one of the lateral channel portions extending along a path defined by a spline from the intake opening to the outlet opening, a turning angle is defined between a tangent of the spline and the first reference axis when the spline is orthogonally projected onto the centerline plane, the turning angle increasing from the intake opening to a maximum turning angle at a first transition position along the spline and then decreasing until reaching the outlet opening, and when the splines are orthogonally projected onto a transverse plane perpendicular to the centerline plane, the splines diverge from one another between the intake opening and a second transition position along the transverse plane and then converge toward each other until the outlet opening.

In accordance with a further aspect, there is provided a gas turbine engine having an aircraft intake duct for an annular engine compressor inlet of the gas turbine engine, the annular engine compressor inlet having a compressor reference axis that is substantially coaxial with a centerline of the engine and a reference plane extending from such compressor reference axis, the reference plane dividing the compressor inlet into a first side and an opposite second side, the aircraft intake duct comprising: an oblong air intake inlet located on the first side of the reference plane; a central intake channel fluidly linking a central section of the air intake inlet to a section of the compressor inlet located on the first side of the reference plane; and two distal intake channels fluidly linking distal sections of the air intake inlet, such distal sections being located on each sides of the central section of the air intake inlet, to a section of the compressor inlet located on the second side of the reference plane.

In accordance with another aspect, there is further provided a gas turbine engine comprising: an annular engine compressor inlet, the annular engine compressor inlet having a compressor reference axis co-axial with an engine centreline and a reference plane that extends from such compressor reference axis and divides the annular engine compressor inlet into a first side and an opposite second side; and an air intake for channeling a flow of ambient air to the annular engine compressor inlet, the air intake comprising: an oblong intake inlet for receiving the flow of ambient air therein, the intake inlet being offset radially outwardly relative to the compressor reference axis and located on one side of the reference plane, and two distal intake channels fluidly linking each distal section of the air intake inlet to a section of the compressor inlet located on the second side of the reference plane.

In accordance with yet another aspect, there is also provided a turboprop gas turbine engine, the turboprop gas turbine engine having a main shaft axis and an inlet duct for providing inlet air to the turboprop gas turbine engine, the inlet duct radially offset from the engine shaft axis and leading from an engine inlet to an engine compressor inlet face, the inlet duct comprising: two side channels created along spline lines which are three-dimensional and extend from the engine inlet to the compressor inlet face; the spline lines define a duct turn have a turning angle along a length of the side channels with a maximum turning angle α that is less than 90-degrees, the spline lines diverge from one another when viewed in a horizontal plane, and diffusion along the spline lines occurs prior to the duct turn; a central channel in an inlet region of the inlet duct extending from one of the two side channels to the other; and inner and outer revolved surfaces communicating between the two side channels and the compressor inlet face.

Further details of these and other aspects of the subject matter of this application will be apparent from the detailed description and drawings included below.

BRIEF DESCRIPTION OF THE DRAWINGS

Reference is now made to the accompanying figures in which:

FIG. 3A is a perspective view of a portion of the aircraft intake duct shown in FIG. 2;

FIG. 3B is an alternate perspective view of a portion of the aircraft intake duct shown in FIG. 2;

FIG. 4B is a top view of the aircraft intake duct shown in FIGS. 3A-3B;

FIG. 4C is a front view of the aircraft intake duct shown in FIGS. 3A-3B;

FIG. 4D is a rear view of the aircraft intake duct shown in FIGS. 3A-3B;

FIG. 5A is a perspective view of a portion of aircraft intake duct shown in FIG. 2;

FIG. 5B is a top view of a portion of aircraft intake duct shown in FIG. 2;

FIG. 6A is a perspective view of the aircraft intake duct shown in FIG. 2;

FIG. 6B is a perspective cut-view of the aircraft intake duct shown in FIG. 2; and FIG. 7 is schematic cross-sectional view of the evolution of the cross-sectional profile as it progresses downstream along the aircraft intake duct shown in FIG. 2.

DETAILED DESCRIPTION

Figure 1:
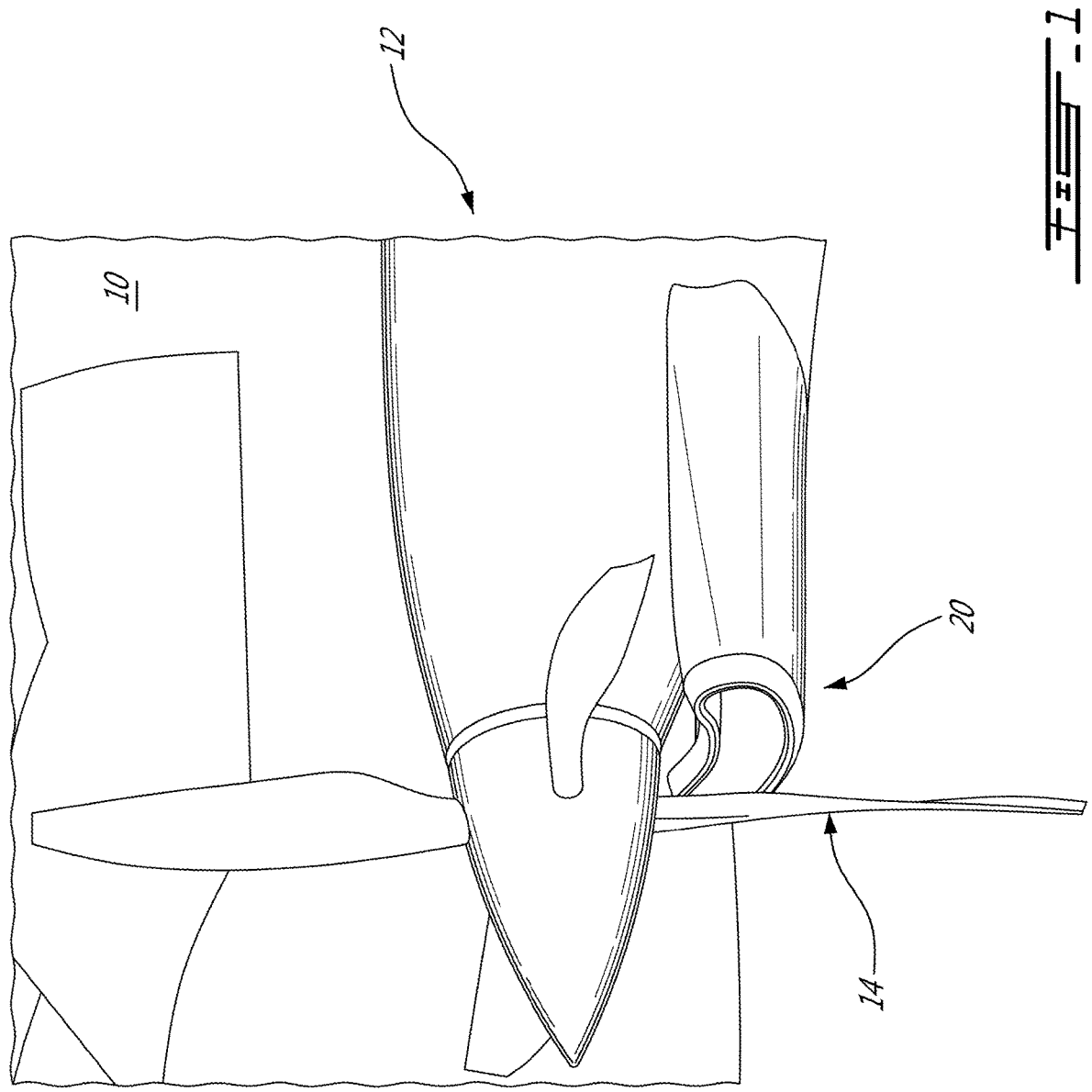
FIG. 1 is a partial perspective view of an exemplary aircraft to which a gas turbine engine comprising an aircraft intake duct as described herein is mounted.

FIG. 1 illustrates a portion of an exemplary turboprop aircraft 10 to which gas turbine engine 12 may be mounted. Gas turbine engine 12 may be a turboprop gas turbine engine of known or other type and suitable for subsonic flight. Gas turbine engine 12 may, for example, be mounted to a wing of aircraft 10. In the example illustrated in FIG. 1, gas turbine engine 12 is a turboprop engine to which propeller 14 is coupled. Gas turbine engine 12 may be housed in a nacelle serving as an aerodynamically-shaped covering for gas turbine engine 12 (for ease of description, the nacelle serving as an aerodynamically-shaped covering for gas turbine engine 12 is not identified). Gas turbine engine 12 may comprise aircraft intake duct 20 for channeling a flow of ambient air therein.

Figure 2:
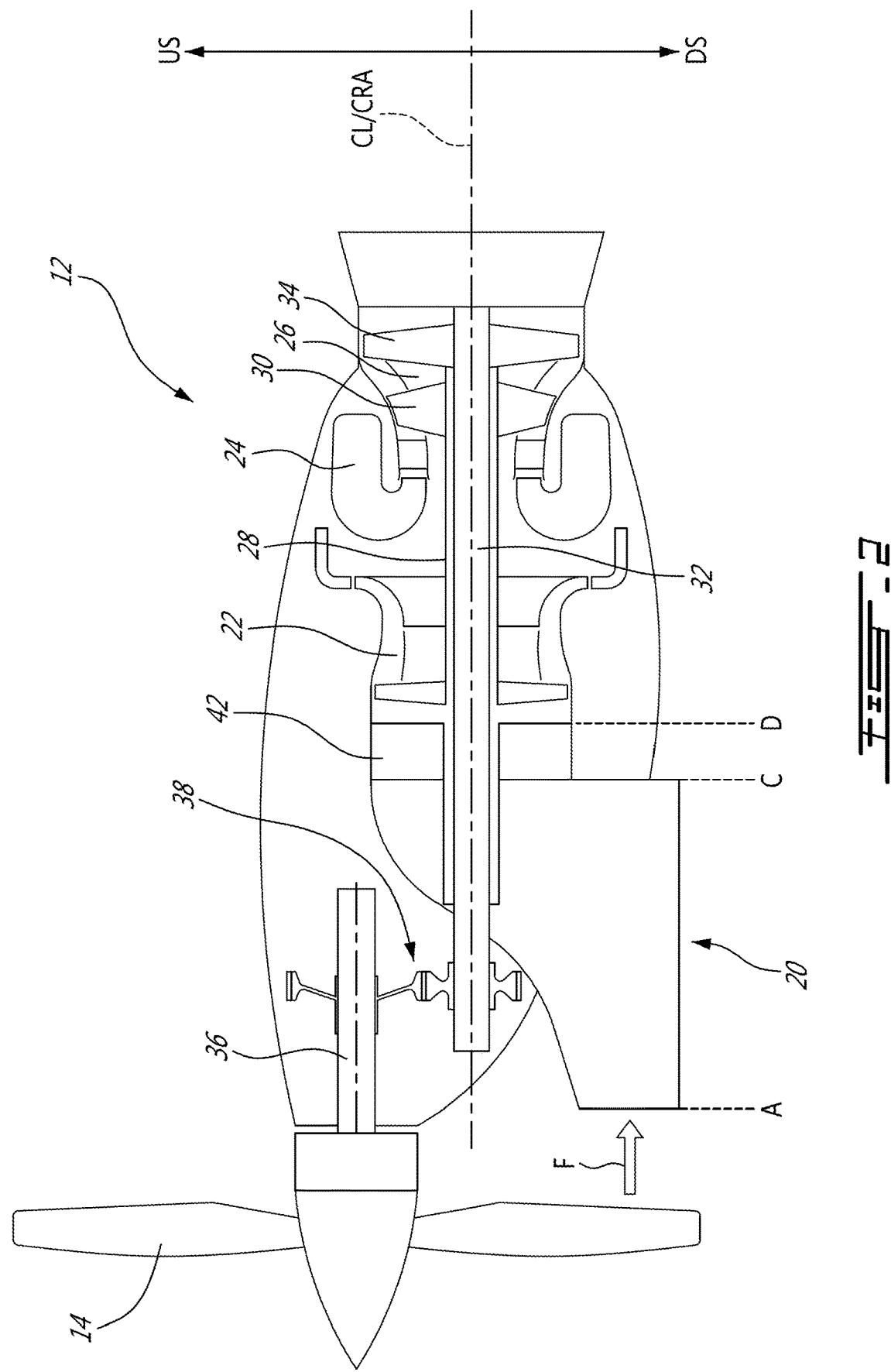
FIG. 2 shows a schematic axial cross-sectional view of an exemplary gas turbine engine comprising the aircraft intake duct as described herein.

FIG. 2 shows a schematic axial cross-section view of an exemplary gas turbine engine 12 of known or other type but comprising aircraft intake duct 20 as described herein. Gas turbine engine 12 may have a through-flow configuration. For example, gas turbine engine 12 may be of a type suitable for use in aircraft applications for subsonic flight generally comprising, in serial flow communication, aircraft intake duct 20 through which ambient air is received, multistage compressor 22 for pressurizing the air, combustor 24 in which the compressed air is mixed with fuel and ignited for generating an annular stream of hot combustion gases, and turbine section 26 for extracting energy from the combustion gases.

In various embodiments, gas turbine engine 12 may have a dual-spool configuration but it is understood that gas turbine engine 12 may not be limited to such configuration. For example, gas turbine engine 12 may comprise high-pressure spool 28 including one or more stages of multistage compressor 22 and one or more high-pressure turbines 30 of turbine section 26. Gas turbine engine 12 may also comprise low-pressure spool 32 including one or more stages of multistage compressor 22 and one or more low-pressure (i.e., power) turbines 34 of turbine section 26. Low-pressure spool 32 may be mechanically coupled to output shaft 36 via gear box 38, to which propeller 14 may be coupled.

In various embodiments, aircraft intake duct 20 is configured to channel the flow of ambient air represented by the arrow F toward engine compressor inlet 42 of gas turbine engine 12. In the current embodiment, engine compressor inlet 42, disposed upstream of compressor 22, has a substantially annular shape and is dimensioned so as not to impede the rotation of high-pressure spool 28 and of low-pressure spool 32. Annular engine compressor inlet 42 is substantially coaxial with engine center line CL. Aircraft intake duct 20 channels a flow of ambient air to annular engine compressor inlet 42, more specifically from intake throat position A to compressor inlet position D.

For the purpose of description and reference with subsequent figures, engine compressor inlet 42 has a compressor reference axis CRA (which in the current embodiment, as outlined previously, is substantially coaxial with engine center line CL) and a reference plane RP (shown in FIGS. 3A-3B) that extends from such compressor reference axis, thereby dividing the compressor inlet into a $1^{st}$ side (in the current embodiment downside DS) and an opposite $2^{nd}$ side (in the current embodiment upside US): aircraft intake duct 20 will be described in relation to such compressor reference axis CRA and reference plane RP. As will be described in more details below, aircraft intake duct 20 supplies a flow of air to both the upside US and downside DS segment of annular engine compressor inlet 42, thereby resulting in a more uniform mass flow of air reaching engine compressor 22.

As shown in FIG. 2, engine center line CL (and, in the current embodiment, compressor reference axis CRA of annular engine compressor inlet 42) does not correspond to the axis of rotation of propeller 14. Indeed, low-pressure spool 32 is mechanically coupled to output shaft 36 via gear box 38, to which propeller 14 is coupled. It is however possible pursuant to the invention, to have engine center line CL coaxial with the axis of rotation of propeller 14.

FIGS. 3-4 show various schematic views of aircraft intake duct 20, more specifically, for ease of description, only the portions of aircraft intake duct 20 supplying a flow of air to the upside US segment of annular engine compressor inlet 42. FIG. 5 will show various schematic views of aircraft intake duct 20, more specifically only the portion of aircraft intake duct 20 supplying a flow of air to the downside DS segment of annular engine compressor inlet 42. Finally, FIG. 6 will show schematic views of aircraft intake duct 20 that include all portions of aircraft intake duct 20 supplying a flow of air to annular engine compressor inlet 42. It is therefore understood that FIGS. 3-4 do not show 2 distinct circular ducts, but instead show 2 circular channels that form part of aircraft intake duct 20. As indicated above, aircraft intake duct 20 will be described in relation to compressor reference axis CRA of engine compressor inlet 42 and to reference plane RP.

Figure 4A:
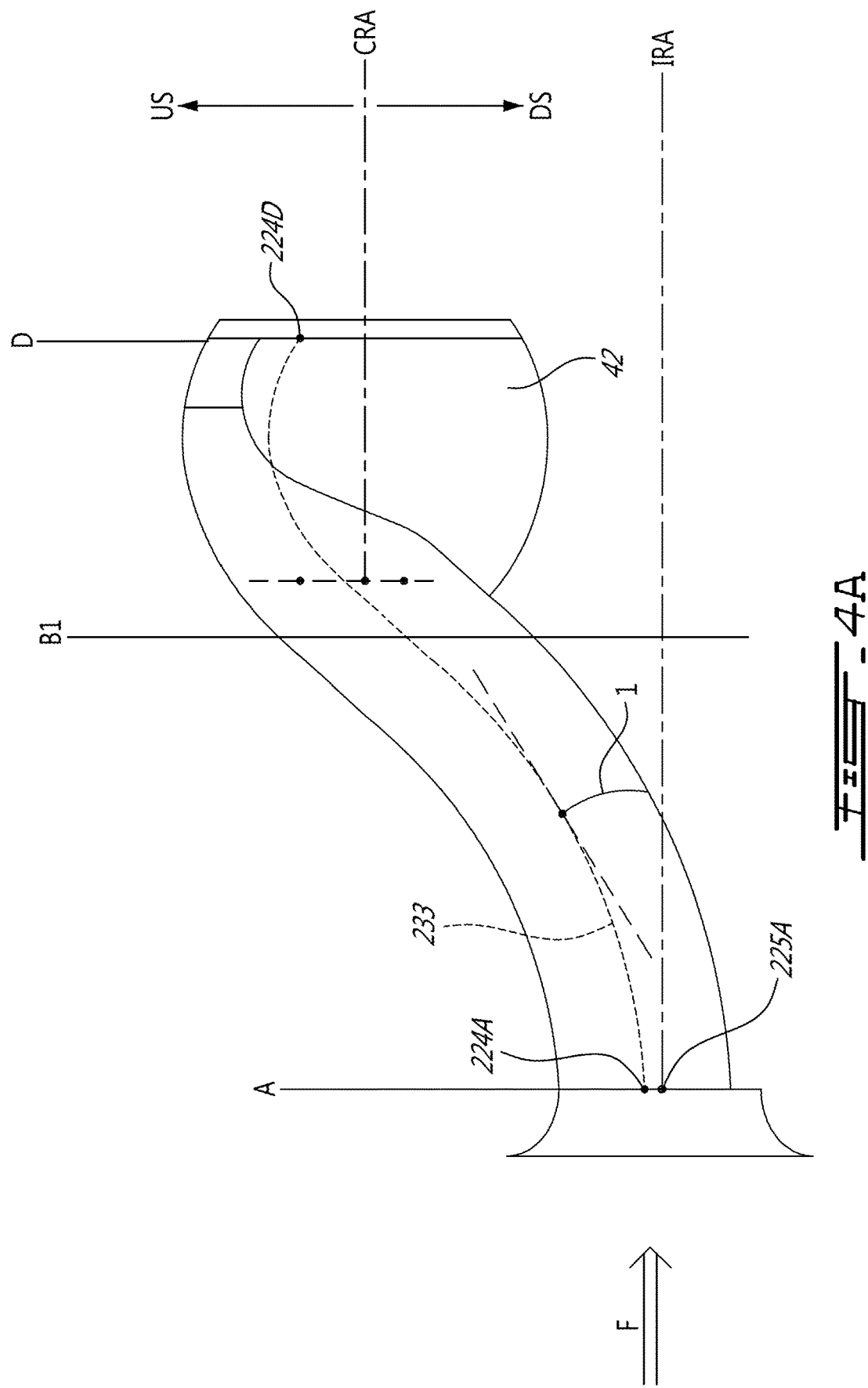
FIG. 4A is a side view of the aircraft intake duct shown in FIGS. 3A-3B.

At intake throat position A, aircraft intake duct 20 has an oblong cross-sectional profile 220A for receiving the flow of ambient air, represented by the arrow F, the oblong cross-sectional profile 220A being offset relative the compressor reference axis CRA and located on a $1^{st}$ side of reference plane RP; more specifically, as shown in shown in FIGS. 3-4, oblong cross-sectional profile 220A is located on downside DS of reference plane RP. Oblong cross-sectional profile 220A has a generally kidney or bean shape i.e. (as shown clearly in FIG. 4C) each distal extremity section 223A of such oblong cross-sectional profile 220A is located closer to the reference plane RP than a central section 221A of the oblong cross-sectional profile 220A. Stated differently, with reference to the current embodiment and as will be explained in more details below (and as shown in FIG. 4A), this means that the each distal intake channel inlet center point 224A is located closer to the reference plane RP than the central section inlet center point 225A. It is however understood that oblong cross-sectional profile 220A may be of other suitable oblong shape.

Aircraft intake duct 20 has two distal intake channels 230, each distal intake channel 230 fluidly linking each distal extremity section 223A to a segment of the annular compressor engine inlet 42 located on a $2^{nd}$ side of reference plane RP; more specifically, as shown in shown in FIGS. 3-4, located on upside US of reference plane RP.

Each distal intake channel 230 is created based on an intake channel spline line 233 i.e. a line passing through substantially all of the control points between intake throat position A and compressor inlet position D (thus generally reflecting the path of the intake flow that reaches the engine compressor 22). Details about the particularities of each distal intake channel 230, with reference to intake channel spline line 233, will now be described.

In the current embodiment, each distal intake channel 230 has a substantially circular cross-sectional profile (but other cross-sectional profiles are possible); consequently, each distal extremity section 223A has a substantially circular shape and has a distal intake channel inlet center point 224A (such center point 224A being an extremity of intake channel spline line 233). The remaining space between each such distal extremity section 223A of oblong air intake inlet 220A, in the current embodiment an hour-glass profile shape section, is central section 221A. Central section 221A, and more generally central intake channel 330 which fluidly links oblong cross-sectional profile 220A to a segment of the annular compressor engine inlet 42 located on downside DS of reference plane RP, will be discussed in more details below.

For the purpose of description and reference with subsequent figures, oblong cross-sectional profile 220A has an air intake inlet reference axis IRA which extends axially from central section inlet center point 225A. Air intake inlet reference axis IRA, which is radially offset from compressor reference axis CRA (as shown in FIG. 4A) and coplanar with such compressor reference axis CRA (as shown in FIG. 4B, looking from the top), air intake inlet reference axis IRA and compressor reference axis CRA being in the same plane, will serve as the reference basis for describing the particularities of each distal intake channel 230 (and, later, of central intake channel 330).

As indicated above, each distal intake channel 230 fluidly links oblong cross-sectional profile 220A, located on one (or $1^{st}$) side of reference plane RP (in the current embodiment downside DS), to a segment of the annular compressor engine inlet 42 located on the other (or $2^{nd}$) side of reference plane RP (in the current embodiment upside US). As shown in FIG. 4A, distal intake channel turning angle 1, which is the angle between a tangent of intake channel spline line 233 at a particular point along such spline line and air intake inlet reference axis IRA, is greater than or equal to 0 deg at intake throat position A; as one travels downstream from intake throat position A towards engine compressor inlet 42, distal intake channel turning angle 1 increases gradually until it reaches a maximum value, at a position identified, for the purpose of this description, as distal intake channel turning transition position B1; distal intake channel turning angle 1 then gradually decreases until it reaches compressor inlet position D i.e. each distal intake channel outlet center point 224D, being the other extremity of intake channel spline line 233. In order to minimize flow losses and/or the creation of secondary flow (as both lead to limitations on engine performance), it has been found that distal intake channel turning angle 1 should not exceed 40 deg (i.e. the distal intake channel turning angle 1 maximum value should not be more than 40 deg); this means that intake channel spline line 233's radius of curvature, more specifically the local radius of curvature at any point along of intake channel spline line 233, is always large enough to ensure that air following such spline line is not subject to undesirable bends or turns.

Whereas a high placement of each distal intake channel inlet center point 224A will have a positive effect (by minimising the distal intake channel turning angle 1 maximum that is necessary to bring the flow to a segment of the annular compressor engine inlet 42 located on the other (or 2nd) side of reference plane RP), too high a placement will result in unacceptable risks related to the ingestion of foreign objects into engine compressor inlet 42 and, consequently, into compressor 22; the optimal position will therefore depend on the particularities of the application. The placement of central section inlet center point 225A, and more generally of central section 221A, which in the current embodiment is hour-glass shaped, will be limited by the location of engine parts such as gear box 38.

In order to slow down the high speed flow that enters the inlet, each distal intake spline line 233 has first an outwardly diffusion profile. More specifically, as shown in FIG. 4B, distal intake channel diffusion angle 2, which is the fan-out angle between both intake channel spline lines 233 in the reference plane RP, is greater than 0 deg at the intake throat position A and remains so greater than 0 deg up to a position identified, for the purpose of this description, as distal intake channel diffusion transition position B2. Each distal intake channel 230 therefore has first an outwardly trajectory, in relation to compressor reference axis CRA, until such distal intake channel diffusion transition position B2. In the current embodiment, each distal intake channel 230 fans outwardly (i.e. in a plane parallel to reference plane RP, each intake channel spline lines 233 moves away from compressor reference axis CRA) substantially similarly to one another (i.e. with a similar outward angle); however, the particularities of the trajectory of each distal intake channel 230, as well as the location of distal intake channel diffusion transition position B2, will depend on the particularities of engine 12. After distal intake channel diffusion transition position B2, each distal intake channel 230 turns inwardly (i.e. in a plane parallel to reference plane RP, each intake channel spline lines 233 moves towards compressor reference axis CRA) to merge with engine compressor inlet 42.

In the current embodiment shown at FIG. 4B, the distal intake channel diffusion angle 2, upstream of distal intake channel diffusion transition position B2, is in the range of 7-10 deg, as it was found that such range addresses the particularities of engine 12, without having unacceptable negative effects on flow stability, distortion and swirl. It is however understood that the optimum distal intake channel diffusion angle 2, the particularities of the trajectory of each distal intake channel 230 and the location of distal intake channel diffusion transition position B2 will vary depending on the particularities of engine 12 and on anticipated air flow characteristics.

As can be seen in FIGS. 4C-4D, each distal intake channel 230 is configured to channel a portion of the flow of ambient air from intake throat position A to a portion of engine compressor inlet 42, more specifically from one side of reference plane CRA (in the current embodiment from a $1^{st}$ side or downside DS) to another side of reference plane CRA (in the current embodiment to a $2^{nd}$ side or upside US). As can be seen from the trajectory of intake channel spline line 233, the design of distal intake channel turning angle 1 and of distal intake channel diffusion angle 2 combine to subject the flow of ambient air travelling through intake channel spline line 233 with lesser flow energy losses and lower swirl than prior air inlet channels that typically subject the flow of ambient air to turning angles higher than 40 deg and/or to small local radius of curvatures (such as is the case with air travelling through the elbow-type design).

In the current embodiment, each distal intake channel 230 has a substantially circular cross-sectional profile with a substantially constant cross-sectional area. However, as will be seen in more details below, as one progresses downstream from intake throat position A, the blending with central intake channel 330 results in the overall cross-sectional area of aircraft intake duct 20 increasing until about transition position B2 and then decreasing downstream of such transition position B2. More details about the sizing requirements of each distal intake channel 230 and the evolution of the overall cross-sectional area of aircraft intake duct 20 will be outlined later, following the description the channel fluidly linking central section 221A to engine compressor inlet 42.

FIG. 5 show various schematic views of aircraft intake duct 20 with focus, for ease of description of aircraft intake duct 20, on the portions of aircraft intake duct 20 supplying a flow of air to the downside DS segment of annular engine compressor inlet 42 (FIG. 6 will show schematic views of aircraft intake duct 20 that include all portions of aircraft intake duct 20 supplying a flow of air to annular engine compressor inlet 42). As was the case above, aircraft intake duct 20 will be described in relation to compressor reference axis CRA of engine compressor inlet 42, air intake inlet reference axis IRA and to reference plane RP.

Aircraft intake duct 20, located on $1^{st}$ side of reference plane RP (more specifically located on downside DS of reference plane RP), has a central intake channel 330 fluidly linking intake throat position A to a segment of the annular compressor engine inlet 42 located on the same side of reference plane RP (more specifically, as shown in shown in FIG. 5, located on $1^{st}$ side, or downside DS, of reference plane RP). Central intake channel 330 has a converging cross-sectional profile as one travels downstream from intake throat position A i.e. the cross-sectional area of central intake channel 330 decreases as one travels downstream from intake throat position A.

Figure 5C:
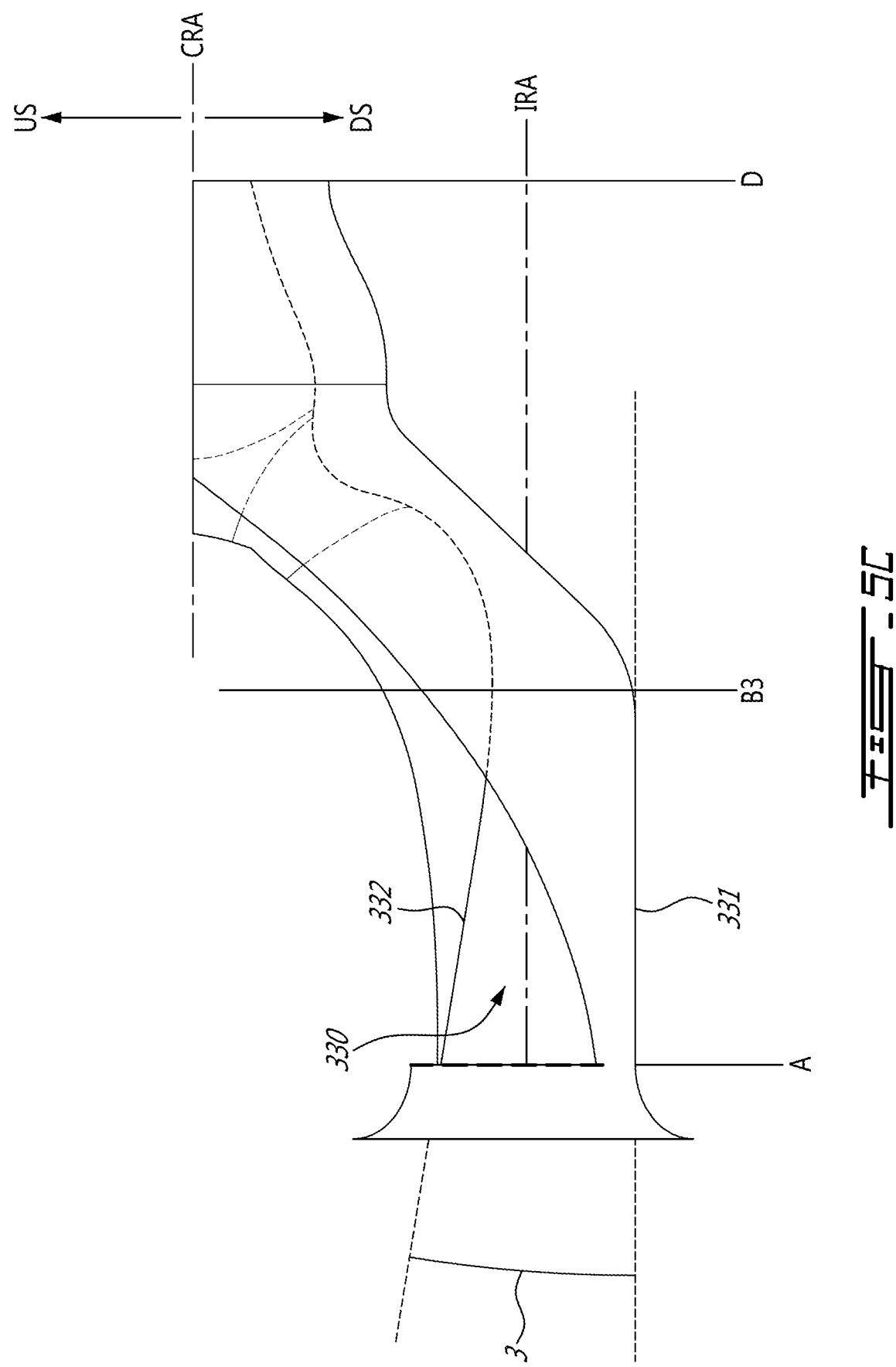
FIG. 5C is a side view of a portion of aircraft intake duct shown in FIG. 2.

The cross-sectional area of central intake channel 330 decreases in a plane perpendicular (as shown in FIG. 5C) to reference plane CRA, as one travels downstream from intake throat position A; this is achieved by a contraction angle 3 between a top 332 and bottom 331 wall of such central intake channel 330. In the current embodiment, bottom wall 331 of such central intake channel 330 is substantially parallel to air intake inlet reference axis IRA and top wall 332 is angled downward by 5 deg to 15 deg; however, other profiles are possible to achieve the desired cross-sectional area decrease of central intake channel 330, as long as the operation of high-pressure spool 28 and of low-pressure spool 32 and associated parts (such as gear box 38) is not impeded. Once a point identified as central intake channel turning transition position B3 is reached, central intake channel 330 turn upwards towards reference plane RP so as to merge with engine compressor inlet 42, more specifically with portion of engine compressor inlet 42 located on same side of reference plane CRA (in the current embodiment on $1^{st}$ side or downside DS). It should be noted that, in the current embodiment, central intake channel turning transition position B3 corresponds to distal intake channel diffusion transition position B2; it is however possible, pursuant to the invention, for those 2 positions to not correspond exactly.

Therefore, air entering central intake channel 330, more specifically air entering central section 221A, is subject to a contracting cross-sectional profile. As will be explained in more detailed below and shown in FIG. 6, central intake channel 330 is in fluid communication with each distal intake channel 230, such that air entering aircraft intake duct 20 can travel down any such channels (i.e. any of each distal intake channel 230 and central intake channel 330) and move from one such channel to another. Because of such fluid communication between central intake channel 330 and each distal intake channel 230, the converging cross-sectional profile of central intake channel 330 results in air (as it travels downstream), entering central section 221A at intake throat position A, being increasingly pushed outwards towards each distal intake channel 230.

As shown in FIG. 6A, central intake channel 330 and both distal intake channels 230 are fluidly linked to one another to form a single integrated intake duct with a cross-sectional profile 220 that changes as one progresses downstream from intake throat position A (for ease of reference, cross-sectional profile 220 at intake throat position A is identified as cross-sectional profile 220A, cross-sectional profile 220 at diffusion transition position B2 is identified as cross-sectional profile 220B2 etc. . . . ). Indeed, looking at the progression of cross-sectional profile 220 of such single integrated intake duct, it starts from a generally kidney or bean shape cross-sectional profile 220A at intake throat position A (which, as shown in FIGS. 6A and 7, comprises central section 221A and each distal extremity section 223A); such single integrated intake duct then progresses to a U-shape cross-sectional profile (see cross-sectional profile 220B2, as shown in FIG. 7) and then to an increasingly V-shape cross-sectional profile (see cross-sectional profile 220B4, as shown in FIG. 7, with position B4 being located downstream of position B2-B3). As can be seen from such FIG. 7, as one progresses downstream from intake throat position A, the upward and outward movements of each distal intake channel 230 creates an increasing cross-section 223. More specifically, as one progresses downstream from intake throat position A to diffusion transition position B2, the integrated cross-sectional area of both distal extremity cross-sections 223 increases (from distal extremity section 223A at position A to distal extremity section 223B2 at position B2), whereas central section 221 decreases (from central section 221A at position A to central section 221B2 at position B2). Consequently, air travelling downstream from intake throat position A in each distal intake channel 230 sees an increasing cross-sectional area whereas air travelling downstream from intake throat position A in central intake channel 330 sees a decreasing cross-sectional area. This results in air being pushed away from central intake channel 330 into each distal intake channel 230, thereby positively contributing to the airflow requirements of such distal intake channel 230, which supplies air to the upside US segment of annular engine compressor inlet 42. A more uniform mass flow of air therefore reaches engine compressor 22, when compared with already-know air inlet that provide all of the air to downside DS segment of annular engine compressor inlet 42.

Looking again at the overall cross-sectional area of the single integrated intake duct, more specifically the evolution of the overall cross-sectional area 220, such overall cross-sectional area increases substantially linearly from intake throat position A to position B2, then decreases substantially linearly from position B2 to annular engine compressor inlet 42. It has been found that by avoiding the sharp cross-sectional area decrease that is typical of many aircraft intakes, related energy losses, pressure distortions and swirl in the flow of air are minimized, with a consequent positive effect on air flow quality provided to the compressor. Consequently, when designing the specific cross-sectional profile of the whole channel, more specifically when designing the specific cross-sectional profile of central intake channel 330 and each distal intake channel 230, it is preferred to follow this substantial linear increase and decrease.

As shown in FIG. 6A and discussed previously, the whole intake duct, via central intake channel 330 and each distal intake channel 230, provides air to both sides of compressor reference axis CRA of engine compressor inlet 42; more specifically, as further shown in FIG. 7, central intake channel 330 provides air to the downside DS segment of annular engine compressor inlet 42 (central section 221A/221B2/221B4 provides air to bottom section 221D of engine compressor inlet 42) and each distal intake channel 230 provides air to the upside US segment of annular engine compressor inlet 42 (each distal extremity section 223A/223B2/223B4 provides air to top section 223D of engine compressor inlet 42). Consequently, when compared to certain currently existing aircraft intake system, a more uniform flow to the compressor is achieved.

In the embodiment shown in FIGS. 6A-6B, a by-pass channel 430 is added downstream of central intake channel turning transition position B3 in order to evacuate unwanted foreign objects entering aircraft intake duct 20 during operation. The exact shape and position of cross-sectional profile 421 of by-pass channel 430 will however depend on the particular operational needs of engine 12.

The above description is meant to be exemplary only, and one skilled in the art will recognize that changes may be made to the embodiments described without departing from the scope of the invention disclosed. For example, each distal intake channel has an outer circular cross-sectional profile with a substantially constant cross-sectional area; however, such cross-sectional area can be variable depending on the design space constraints and the outer shape can be elliptic. Also, whereas the current embodiment has a kidney shaped profile at the duct's inlet, other oblong profiles are possible pursuant to the invention; therefore, this invention is not limited to Chin or Scoop type inlets, but also applies to other types of inlets such as Pitot type inlets which have more rectangular profiles at the duct's inlet. Still other modifications which fall within the scope of the present invention will be apparent to those skilled in the art, in light of a review of this disclosure, and such modifications are intended to fall within the appended claims.

The invention claimed is:

1. A gas turbine engine having an aircraft intake duct for an annular engine compressor inlet of the gas turbine engine, the annular engine compressor inlet having a compressor reference axis that is coaxial with a centerline of the engine and a reference plane extending from such compressor reference axis, the reference plane dividing the compressor inlet into a first side and an opposite second side, the aircraft intake duct comprising:
   an oblong air intake inlet located on the first side of the reference plane;
   a top wall and a bottom wall extending downstream from such air intake inlet and being slanted towards one another to define a contracting central intake channel of the aircraft intake duct; and
   two side walls extending downstream from such aft intake inlet and being slanted away from one another to define two distal intake channels of the aircraft intake duct, the two distal intake channels being located on each side of the central intake channel.

2. The gas turbine engine of claim 1, wherein each distal intake channel fluidly links the air intake inlet to a section of the compressor inlet located on the second side of the reference plane.

3. The gas turbine engine of claim 1, wherein each distal intake channel, as they extend downstream of the air intake inlet, turns upwards towards the compressor reference axis and the reference plane.

4. The gas turbine engine of claim 1, wherein each distal intake channel, as they extend downstream of the air intake inlet, first turns away from the compressor reference axis then turn towards such compressor reference axis.

5. The gas turbine engine of claim 1, wherein the central intake channel fluidly links the air intake inlet to a section of the compressor inlet located on the first side of the reference plane.

6. The gas turbine engine of claim 1, wherein the central intake channel, as it extends downstream of the air intake inlet, first turns downwards away from the reference plane, then turn upwards towards such reference plane.

7. The gas turbine engine of claim 2, wherein the central intake channel fluidly links the air intake inlet to a section of the compressor inlet located on the first side of the reference plane.

8. The gas turbine engine of claim 2, wherein the central intake channel, as it extends downstream of the air intake inlet, first turns downwards away from the reference plane, then turn upwards towards such reference plane.

9. The gas turbine engine of claim 7, wherein the central intake channel fluidly links each distal intake channel to one another.

10. The gas turbine engine of claim 4, wherein the central intake channel fluidly links the air intake inlet to a section of the compressor inlet located on the first side of the reference plane.

11. The gas turbine engine of claim 4, wherein the central intake channel, as it extends downstream of the air intake inlet, first turns downwards away from the reference plane, then turn upwards towards such reference plane.

12. The gas turbine engine of claim 10, wherein the central intake channel fluidly links each distal intake channel to one another.

13. An intake assembly for a gas turbine engine, the intake assembly comprising an inlet duct extending from an intake opening to an outlet opening and defining a channel therebetween, a first reference axis extending through the intake opening, the outlet opening adapted to supply air to a compressor of the gas turbine engine, the compressor rotatable around a second reference axis spaced apart from the first reference axis, the first and second reference axes extending parallel relative to each other and coplanar in a centerline plane, the centerline plane symmetrically dividing the inlet duct along the channel, the inlet duct defining two lateral channels portions of the channel which are spaced apart on opposite sides of the centerline plane, each one of the lateral channel portions extending along a path defined by a spline from the intake opening to the outlet opening, a turning angle is defined between a tangent of the spline and the first reference axis when the spline is orthogonally projected onto the centerline plane, the turning angle increasing from the intake opening to a maximum turning angle at a first transition position along the spline and then decreasing until reaching the outlet opening, and when the splines are orthogonally projected onto a transverse plane perpendicular to the centerline plane, the splines and a corresponding wall of each lateral channel portion diverge from one another between the intake opening and a second transition position along the transverse plane and then the splines converge toward each other until the outlet opening.

14. The intake assembly as defined in claim 13, wherein the maximum turning angle is at most 45 degrees.

15. The intake assembly as defined in claim 13, wherein the turning angle continuously increases from the intake opening to the first transition position.

16. The intake assembly as defined in claim 13, wherein the turning angle continuously decreases from the first transition position to the outlet opening.

17. The intake assembly as defined in claim 13, wherein a central channel portion of the channel is defined between the two lateral channel portions from the intake opening to the first transition position.

18. The intake assembly as defined in claim 13, wherein a central channel portion is defined between the two lateral channel portions from the intake opening to the second transition position.

19. A turboprop gas turbine engine comprising:
a propeller;
a compressor mounted downstream of the propeller relative to a direction of an air flow from the propeller to the compressor; and
an intake assembly disposed between the propeller and the compressor, the intake assembly comprising:
an inlet duct extending from an intake opening to an outlet opening and defining a central channel therebetween, a first reference axis extending through the intake opening, the outlet opening adapted to supply air to a compressor of the gas turbine engine, the compressor rotatable around a second reference axis spaced apart from the first reference axis, the first and second reference axes extending parallel relative to each other and coplanar in a centerline plane, the centerline plane symmetrically dividing the inlet duct along the channel, the inlet duct defining two lateral channel portions of the channel which are spaced apart on opposite sides of the centerline plane, each one of the lateral channel portions extending along a path defined by a spline from the intake opening to the outlet opening, a turning angle is defined between a tangent of the spline and the first reference axis when the spline is orthogonally projected onto the centerline plane, the turning angle increasing from the intake opening to a maximum turning angle at a first transition position along the spline and then decreasing until reaching the outlet opening, and when the splines are orthogonally projected onto a transverse plane perpendicular to the centerline plane, the splines and a corresponding wall of each lateral channel portion diverge from one another between the intake opening and a second transition position along the transverse plane and then the splines converge toward each other until the outlet opening.

20. The turboprop gas turbine engine as defined in claim 19, wherein the maximum turning angle is at most 45 degrees.

21. The turboprop gas turbine engine as defined in claim 19, wherein the turning angle continuously increases from the intake opening to the first transition position.

22. The turboprop gas turbine engine as defined in claim 19, wherein the turning angle continuously decreases from the first transition position to the outlet opening.

23. The turboprop gas turbine engine as defined in claim 19, wherein a central channel portion of the channel is defined between the two lateral channel portions from the intake opening to the first transition position.

24. The turboprop gas turbine engine as defined in claim 19, wherein a central channel portion is defined between the two lateral channel portions from the intake opening to the second transition position.

25. A gas turbine engine having an aircraft intake duct for an annular engine compressor inlet of the gas turbine engine, the annular engine compressor inlet having a compressor reference axis that is coaxial with a centerline of the engine and a reference plane extending from such compressor reference axis, the reference plane dividing the compressor inlet into a first side and an opposite second side, the aircraft intake duct comprising:
- an oblong air intake inlet located on the first side of the reference plane;
- a central intake channel extending downstream from the oblong air intake and having top and bottom walls slanted towards each other, and the central intake channel fluidly linking a central section of the air intake inlet to a section of the compressor inlet located on the first side of the reference plane; and
- two distal intake channels separated from each other by the central intake channel and fluidly linking distal sections of the air intake inlet, such distal sections being located on each sides of the central section of the air intake inlet, to a section of the compressor inlet located on the second side of the reference plane.

26. The gas turbine engine of claim 25, wherein each distal intake channel has a spline line turning angle greater than 0 degrees at the oblong air intake inlet.

27. The gas turbine engine of claim 26, wherein the spline line turning angle is less than 40 degrees.

28. The gas turbine engine as defined in claim 25, wherein the central intake channel has a contraction angle.

29. The gas turbine engine as defined in claim 28, wherein the contraction angle is between 5 degrees and 15 degrees.

30. The gas turbine engine as defined in claim 27, wherein the central intake channel has a contraction angle.

31. The gas turbine engine as defined in claim 25, wherein each distal intake channel has a spline line diffusion angle greater than 0 degrees at the oblong intake inlet.

32. The gas turbine engine as defined in claim 31, wherein each distal intake channel has a spline line diffusion angle between 7 degrees and 10 degrees at the oblong intake inlet.

33. The gas turbine engine as defined in claim 26, wherein each distal intake channel has a spline line diffusion angle greater than 0 degrees at the oblong intake inlet.

34. The gas turbine engine as defined in claim 28, wherein each distal intake channel has a spline line diffusion angle greater than 0 degrees at the oblong intake inlet.

35. The gas turbine engine as defined in claim 30, wherein each distal intake channel has a spline line diffusion angle greater than 0 degrees at the oblong intake inlet.

36. A gas turbine engine comprising:
- an annular engine compressor inlet, the annular engine compressor inlet having a compressor reference axis co-axial with an engine centreline and a reference plane that extends from such compressor reference axis and divides the annular engine compressor inlet into a first side and an opposite second side; and
- an air intake for channeling a flow of ambient air to the annular engine compressor inlet, the air intake comprising:
  - an oblong intake inlet for receiving the flow of ambient air therein, the intake inlet being offset radially outwardly relative to the compressor reference axis and located on one side of the reference plane,
  - a central intake channel having top and bottom walls slanted towards each other, and fluidly linking a central section of the oblong intake inlet to a segment of the annular engine compressor inlet, and
  - two distal intake channels separated from each other by the central intake channel and fluidly linking two corresponding distal sections of the air intake inlet to a section of the compressor inlet located on the second side of the reference plane.

37. The gas turbine engine of claim 36, wherein each distal intake channel has a spline line turning angle greater than 0 degrees at the oblong intake inlet.

38. The gas turbine engine of claim 37, wherein the spline line turning angle is less than 40 degrees.

39. The gas turbine engine of claim 38, wherein the segment of the annular engine compressor inlet is located on the one side of the reference plane.

40. The gas turbine engine of claim 39, wherein the central intake channel has a decreasing cross-sectional profile from the oblong intake inlet to a start of turn position located downstream of the oblong intake inlet.

41. The gas turbine engine of claim 40, wherein the central intake channel fluidly links each distal intake channel to one another.

42. The gas turbine engine as defined in claim 39, wherein the central intake channel and the two distal intake channels have a combined cross-sectional area which increases substantially linearly from the intake inlet to the start of turn position.

43. The gas turbine engine as defined in claim 42, wherein the central intake channel and the two distal intake channels have a combined cross-sectional area which decreases substantially linearly from the start of turn position to the annular engine compressor inlet.

44. The gas turbine engine of claim 36, wherein each distal intake channel has a spline line diffusion angle greater than 0 degrees at the oblong intake inlet.

45. The gas turbine engine of claim 44, wherein the spline line diffusion angle is between 7 degrees and 15 degrees.

46. The gas turbine engine of claim 36, wherein, in a parallel plane to the reference plane, from oblong intake inlet annular engine inlet, each distal intake channel first fans outward then turns inward.

47. The gas turbine engine of claim 46, wherein the segment of the annular engine compressor inlet is located on the one side of the reference plane.

48. The gas turbine engine of claim 47, wherein the central intake channel has a decreasing cross-sectional profile from the oblong intake inlet to a start of turn position located downstream of the oblong intake inlet.

49. The gas turbine engine of claim 48, wherein the central intake channel fluidly links each distal intake channel to one another.

50. The air intake as defined in claim 44, wherein the central intake channel and the two distal intake channels have a combined cross-sectional area which increases substantially linearly from the intake inlet to the start of turn position.

51. The gas turbine engine as defined in claim 50, wherein the central intake channel and the two distal intake channels have a combined cross-sectional area which decreases substantially linearly from the start of turn position to the annular engine compressor inlet.

52. The gas turbine engine of claim 36, wherein each distal extremity of the oblong intake inlet is located closer to the compressor reference axis than a central section of the oblong intake inlet.

53. The gas turbine engine of claim 52, wherein the segment of the annular engine compressor inlet is located on the one side of the reference plane.

54. The gas turbine engine of claim 53, wherein the central intake channel has a decreasing cross-sectional profile from the oblong intake inlet to a start of turn position located downstream of the oblong intake inlet.

55. The gas turbine engine of claim 54, wherein the central intake channel fluidly links each distal intake channel to one another.

56. The gas turbine engine as defined in claim 52, wherein the central intake channel and the two distal intake channels have a combined cross-sectional area which increases substantially linearly from the intake inlet to the start of turn position.

57. The gas turbine engine as defined in claim 56, wherein the central intake channel and the two distal intake channels have a combined cross-sectional area which decreases substantially linearly from the start of turn position to the annular engine compressor inlet.

58. A turboprop gas turbine engine, the turboprop gas turbine engine having a main shaft axis and an inlet duct for providing inlet air to the turboprop gas turbine engine, the inlet duct radially offset from the engine shaft axis and leading from an engine inlet to an engine compressor inlet face, the inlet duct comprising:
two side channels created along spline lines which are three-dimensional and extend from the engine inlet to the compressor inlet face; the spline lines define a duct turn have a turning angle along a length of the side channels with a maximum turning angle $\alpha$ that is less than 90-degrees, the spline lines diverge from one another when viewed in a horizontal plane, and diffusion along the spline lines occurs prior to the duct turn;
a central channel in an inlet region of the inlet duct extending from one of the two side channels to the other; and
inner and outer revolved surfaces communicating between the two side channels and the compressor inlet face.

59. The turboprop gas turbine engine as defined in claim 58, wherein the maximum turning angle $\alpha$ is less than 45 degrees.

60. The turboprop gas turbine engine as defined in claim 58, wherein the central channel in the inlet region of the inlet duct is defined by surfaces blended between the two side channels formed along the spline lines.

* * * * *